S. M. YOUNG & F. TOWNSEND.
ELECTRIC SIGNALING SYSTEM.
APPLICATION FILED NOV. 21, 1903.
1,154,588.
Patented Sept. 21, 1915.
2 SHEETS—SHEET 1.
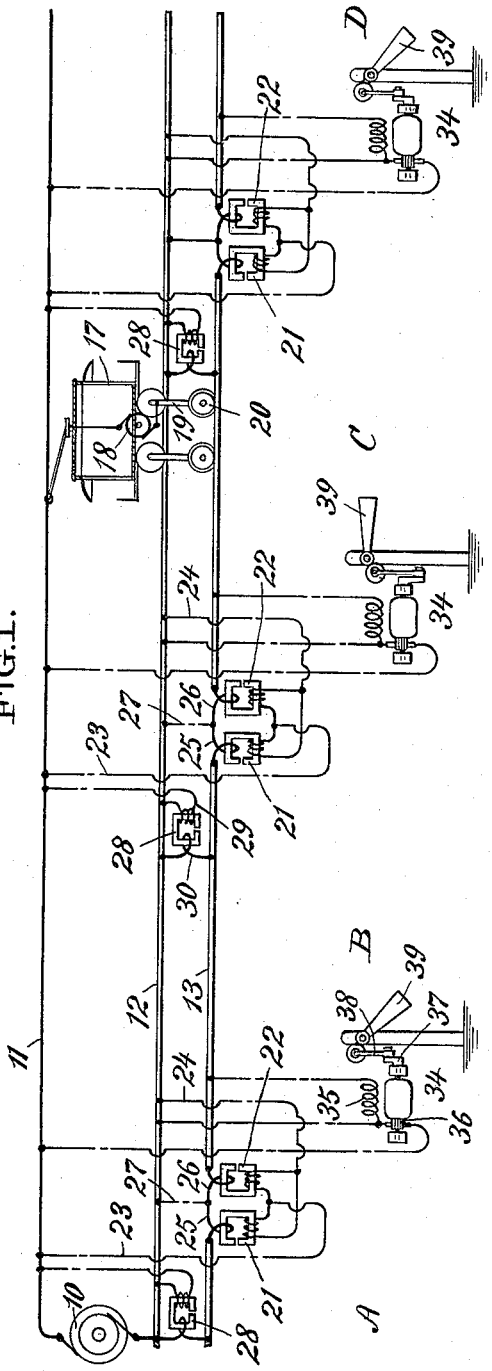
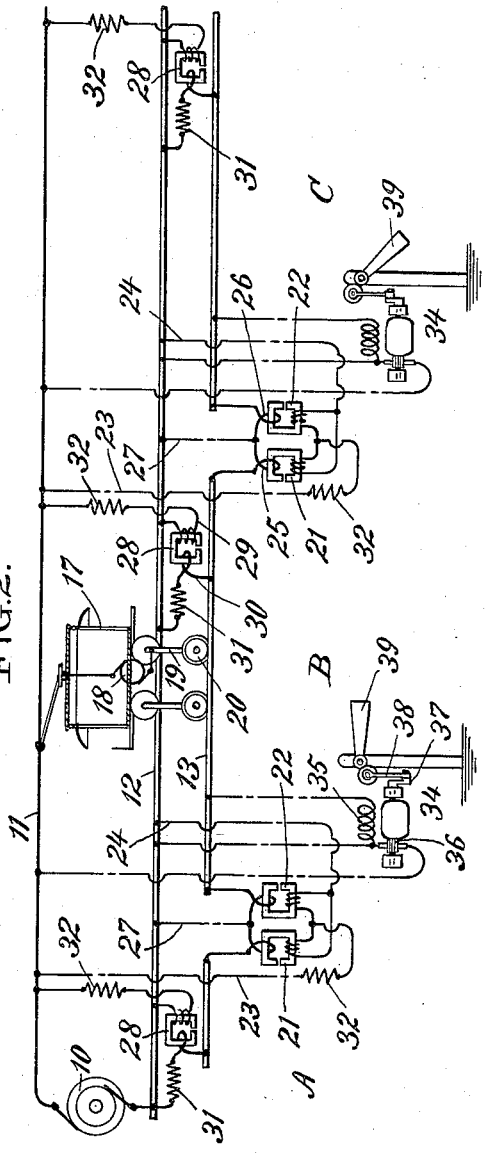
WITNESSES:
J. E. Pearson
Frank O'Connor
INVENTORS
S. Marsh Young
Fitzhugh Townsend
BY
Geo. H. Benjamin
ATTORNEY

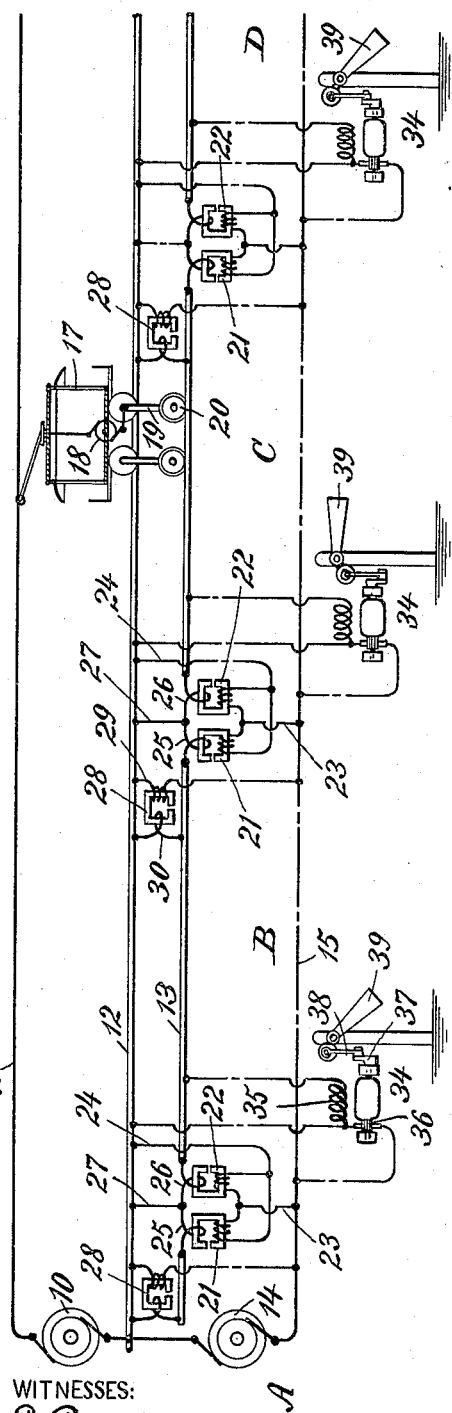
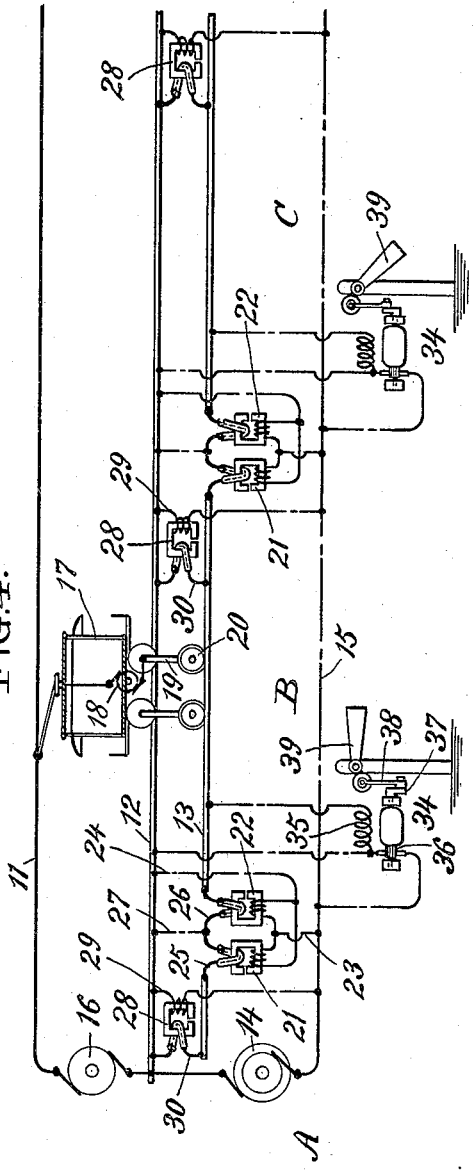

UNITED STATES PATENT OFFICE.

SAMUEL MARSH YOUNG AND FITZHUGH TOWNSEND, OF NEW YORK, N. Y., ASSIGNORS TO SAID YOUNG.

ELECTRIC SIGNALING SYSTEM.

1,154,588.  Specification of Letters Patent.  Patented Sept. 21, 1915.

Application filed November 21, 1903. Serial No. 182,079.

*To all whom it may concern:*

Be it known that we, SAMUEL MARSH YOUNG and FITZHUGH TOWNSEND, citizens of the United States, residing at New York city, county and State of New York, have invented certain new and useful Improvements in Electric Signaling Systems, of which the following is a specification.

The invention relates to an automatic block signaling system for electric railways.

In prior applications, filed in the name of Samuel Marsh Young, Serial Numbers 144,548, 154,275, 160,086, there is described a system of automatic block signaling for electric railways embodying two sources of current differing in character, outgoing feeder conductors leading therefrom, a trackway formed of two rails, divided into a series of sections, means for creating a difference of potential between the rails of each section, a signaling device in each section, normally energized by such difference of potential and held thereby in the "clear position" and deënergized to move to the "danger position", and be maintained in such position when a car moves into a section, and means introduced between separated ends of one rail of each section for electrically separating adjacent sections, so far as relates to the current employed to actuate the signaling devices in said sections, but which permit both rails of all of the sections to serve as a common return for both currents.

Our present invention, while it may be said to embody the general principle of operation set forth in the above mentioned applications, differs therefrom in the following particulars:

First: Instead of using two sources of electrical energy generating currents differing in character, we may use a single source of electrical energy, or two sources of electrical energy of the same character, but differing in phase or frequency.

Second: Instead of creating the required difference of potential between the opposite rails of each section by means of a single transformer, having its primary connected across the source of energy and its secondary across the rails, we create the required potential in a block by means of two transformers, which have their primaries connected in parallel across the source of energy and their secondaries wound in opposition and connected in parallel across the rails. A pair of transformers are located at each end of a section, with their secondaries connected in series across the divided ends of one rail of adjacent sections. We may also make use of another transformer in each block, having its primary connected across the source of energy and its secondary across the rails.

Third: Instead of using a relay device, in each section, which serves to open and close a local circuit, and thus control the movement of the signaling device in one direction, we employ a motor device, having one member connected across the source of energy and the other member across the rails of the section.

The advantages of the present arrangement of parts over those described in the applications above mentioned are: (a) The number of sources of energy or currents used may be decreased. (b) The electrical individuality of the sections so far as relates to the current used to operate the signaling devices, is more distinct. (c) The amperage of the current transmitted to the rails for operating the signals in each section may be largely increased, without correspondingly increasing the difference of potential between the rails. (d) The employment of a relay and local circuit is done away with.

The accompanying diagrams will serve to illustrate our invention.

Figure 1 is a diagram showing the general arrangement of the system, where one source of alternating current is employed. Fig. 2 is a corresponding diagram, showing the same general arrangement, with the addition of resistance in the circuits of the current transforming devices. Fig. 3 is a diagram showing the general arrangement of the system, where two sources of alternating current energy are employed. Fig. 4 is a similar diagram, showing the general arrangement of the system, where one source of direct current and one source of alternating current are employed. Fig. 5 is an enlarged view of a portion of the rail-bond used in the construction shown in Fig. 4.

Referring to the diagrams: In Figs. 1 and 3, the trackway is shown as divided into four sections, A, B, C, D, in Figs. 2 and 4, into three sections, A, B, C. Manifestly, the number of sections will depend upon the length of road, and the length of each section may be such as desired.

10 indicates an alternating generator, connected in Figs. 1, 2, 3, across the feeder conductor 11, and the two track-rails 12, 13. In Figs. 1 and 2 the generator 10 is assumed to be of sufficient capacity to operate the car motors and the signaling devices; and in Fig. 3 to operate the car motors. In Figs. 3 and 4, a second alternating generator, 14, is shown connected across the feeder conductor 15 and the track-rails 12, 13. The generator 14 is assumed to be sufficient capacity to operate the signaling devices.

In the construction shown in Fig. 3, the generators 10, 14, while both alternating generators, may have their currents differentiated either as to phase or frequency; as for instance, one generator may deliver a current of 25 cycles and the other 100 or more cycles. It will be understood by electricians, without further description, that a phase or the phases of one current may be used to operate the car motors and a phase or the phases of the other current to actuate the signaling devices; or, a current of one frequency to operate the car motors, and that of the other frequency to operate the signaling devices, and that there will be no intermingling of such currents. Or, in other words, that each current will perform its office irrespective of the other, and irrespective of the fact that both are impressed upon the two rails of the system as a common return.

16, Fig. 4, indicates a direct current generator, connected across the feeder conductor 11 and the two rails 12, 13.

17 indicates a car carrying a motor 18, one terminal of which is connected to the axle 19, on the ends of which are the wheels 20.

In the construction shown in Figs. 1 and 2, the alternating current from the generator 10 actuates the car motors, creates the difference of potential between the rails, and actuates the signaling devices. In the construction shown in Fig. 3, the generator 10 actuates the car motors, and the generator 14 creates the difference of potential between the rails, and actuates the signaling devices. In the construction shown in Fig. 4 the direct current generator actuates the car motors, and the alternating current generator 14 creates the difference of potential between the rails and actuates the signaling devices.

The electrical individuality of the sections A, B, C, D, of the trackway is obtained in the manner which we will now proceed to describe.

In the former applications referred to, a reactance bond was interposed between the ends of the rail 13 of adjacent sections, and further, a reactance cross-bond was used. The effect of using the reactance bond between the ends of the rail 13 was two-fold: First, to increase the electrical resistance and reactance of the rail 13 as a whole and second, to set up a reactance between adjacent sections of the rail 13, and thus prevent the passage of an alternating current from one section to the next; as for instance, from A to B, while permitting the passage of the power current used to operate the car motors. This device, in practice, proved to be satisfactory, but is open to the objection, that the total resistance of the rail 13 to the power current is greater than that of the rail 12. Or, in other words, the reactance bonds interposed an impedance in the return path of the currents to the generator or generators.

In the present case there is substituted for each reactance bond two transformers 21, 22, the primaries of which 23, 24, are connected in parallel across the feeder conductor 11 and one rail 12, Figs. 1 and 2; or, as shown in Figs. 3 and 4, in parallel across the feeder conductor 15 and the rail 12. The secondaries of these transformers, 25, 26, are wound in opposite directions on the transformers 21, 22, and connected to the ends of the adjacent sections of the rail 13. In all of the figures, each secondary makes a minimum of one turn around the core of the transformer. The object of using one turn is to avoid the impedance effect due to a number of turns; especially where the power current is an alternating current. In cases where the power current is a direct current, the number of turns may be increased, with a corresponding decrease in the amount of iron in the core of the transformer. The arrangement shown also greatly diminishes any magnetization of the cores of the transformers 21, 22 by the power current used to operate the car motors. A conductor 27 connects a central point between the secondaries 25, 26 with the rail 12. It will be observed that the secondaries are in parallel across the rails 12, 13, and in series between the ends of adjacent rails 13. A third transformer 28, is also employed in each section, having its primary 29 connected across, in Figs. 1 and 2, the feeder conductor 11 and the rail 12, or in Figs. 3 and 4, across the feeder conductor 15 and the rail 12, and its secondary 30 across the rails 12, 13.

It will be seen from the above that there are three transformers in each section, i. e., in section B, for instance, the transformer 22 at the left, transformer 21 at the right, and transformer 28 in the section, and that the difference of potential between the rails 12. 13 is derived from the secondaries of these transformers; and further, that the transformers 21, 22, whether located adjacent at the end of a section, or separated by the length of a section, are wound to oppose each other.

It will further be observed that if the conducting capacity of the secondaries of the transformers 21, 22 in series, is made equal per unit of length to that of the rail 13, the rail in fact will act as one continuous rail and present approximately the same resistance to the passage of the power current used to operate the motors, as is presented by the rail 12. Or, in other words, the effect of the construction is to increase the conducting capacity of the rails 12, 13, over that of a system where reactance bonds are used instead of transformers.

If desired, and in order to prevent absolute short circuiting of the secondaries of the transformers 21, 22, 28, resistance 31 may be introduced in such secondaries, as shown in Fig. 2, and a similar resistance 32, may, if desired, be introduced in the primaries.

Instead of using such resistance in the secondaries, we may use the arrangement shown in Figs. 4 and 5. In this arrangement, a sleeve of iron 33 is placed over the secondaries 25, 26, 30. Magnetic whirls are set up in this sleeve concentrically to the secondary winding, thereby producing a counter-electro-motive force which causes a drop in the voltage and prevents a dead short circuit. The sleeve, therefore, acts as an impedance; the effect being the same as putting a resistance or reactance in the primary or secondary windings.

It now remains to describe the signaling device employed in each section. This may be constructed in a variety of ways. Preferably we prefer to use an electro-motor 34. The field-magnets 35 of this motor are connected across the rails 12, 13, and its armature 36 across, in Figs. 1 and 2, the feeder conductor 11 and the rail 12, and in Figs. 3 and 4, the feeder conductor 15 and the rail 12. Connected to the armature of this motor is a crank 37, which is connected through a link 38 to a counter-weight semaphore arm 39.

The operation of the system is as follows:—Normally, that is, when no car is on a section, a difference of alternating signal potential exists between the rails 12—13 and the current due to this difference of potential will divide between the two paths open to it, inversely as their resistance and reactance, these two paths being (*a*) the path through the field magnets 35 of the motor 34, and (*b*) the path around the field magnets formed by the rails 12—13 and the crossbond 27. It will of course be understood by electricians that the resistance and reactance of the path around the field magnets (*i. e.* the (*b*) path) will be such that sufficient current will be sent through the field magnets (*i. e.*, the (*a*) path) to impart to such field magnets what is known as "pick-up" value, and as the armature 36 of the motor is excited from across the source of signaling energy, a turning movement of the armature will result, which will push the semaphore arm to the "danger" position shown in sections B, D, of Figs. 1 and 3 and C in Figs. 2 and 4. When a car moves into a block, the secondary 30 of the transformer 28 is short circuited by means of the wheels 20 and axle 19, thereby destroying the difference of potential between the rails, and in effect short circuiting the field-magnets 35 of the motor 34. At this time, the counter-weight on the end of the semaphore arm acts and brings the arm to the "danger position" shown in section C of all four figures. The car as it moves in the block varies the resistance of the secondaries of the transformers 21, 22, at opposite ends of the block, but not sufficiently so to materially effect the opposing action of the transformers 21, 22, disposed at opposite ends of each section.

In this specification we have used the expression "differing in character" as referring to the currents transmitted from the generators 10, 14, 14, 16, that is, two currents differing in phase, two currents differing in frequency, two currents one alternating and the other direct, as differentiated from the expression "differing in strength," as applied to two currents.

We wish it understood that we do not limit ourselves to the special means described for effecting the electrical independence of the sections, as manifestly means other than transformers may be employed where the reactance, retarding or opposing effect of the bond is created by a current of different frequency passing through a conductor, used in connection with or without an iron core.

Having thus described our invention, we claim:—

In a signaling system for electric railways, a plurality of track circuits each of which includes an inductive device comprising a core and a winding which is connected with one line of rails of the track circuit, an electrical connection between adjacent inductive devices and the opposite line of rails, and a second winding on each inductive device traversed by an alternating signaling current of higher potential than an alternating signaling current traversing the first winding of the inductive device.

In testimony whereof we affix our signatures, in the presence of two witnesses.

SAMUEL MARSH YOUNG.
FITZHUGH TOWNSEND.

Witnesses:
J. E. PEARSON,
FRANK O'CONNOR.